J. F. D. HOGE.
ALTERNATING CURRENT RELAY.
APPLICATION FILED SEPT. 23, 1910.

1,056,334.

Patented Mar. 18, 1913.

2 SHEETS—SHEET 1.

Witnesses
Max B. A. Doring.
Paul H. Frank

Inventor
Joseph F. D. Hoge
By Attorney
H. M. Marble

J. F. D. HOGE.
ALTERNATING CURRENT RELAY.
APPLICATION FILED SEPT. 23, 1910.
1,056,334.
Patented Mar. 18, 1913.
2 SHEETS—SHEET 2.
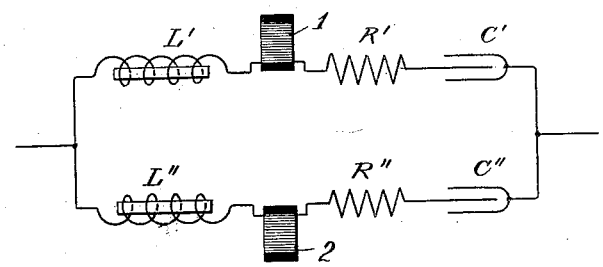
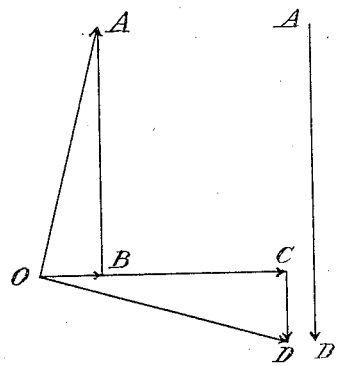
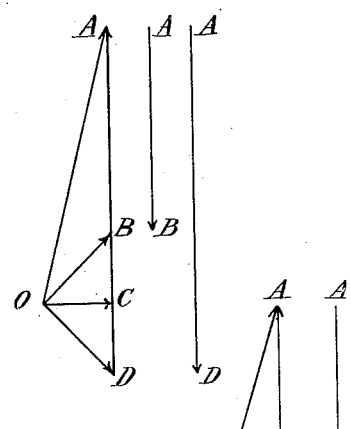
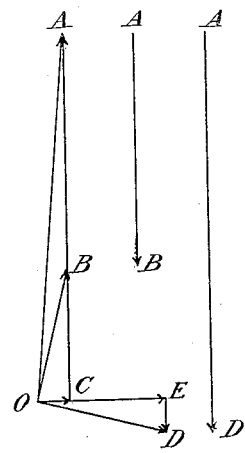
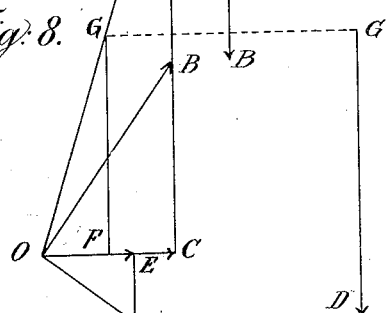
Witnesses:
Max B. A. Doring
Paul H. Frank
Inventor
Joseph F. D. Hoge
By his Attorney
H. M. Marble

UNITED STATES PATENT OFFICE.

JOSEPH F. D. HOGE, OF NEW YORK, N. Y., ASSIGNOR TO AMERICAN DISTRICT TELEGRAPH COMPANY, A CORPORATION OF NEW JERSEY.

ALTERNATING-CURRENT RELAY.

1,056,334.          Specification of Letters Patent.     Patented Mar. 18, 1913.

Application filed September 23, 1910. Serial No. 583,444.

*To all whom it may concern:*

Be it known that I, JOSEPH F. D. HOGE, a citizen of the United States, residing at New York, in the county of New York and State of New York, have invented certain new and useful Alternating-Current Relays, of which the following is a specification.

My invention relates to improvements in relays adapted to be operated by alternating currents of different frequency, and my said relay comprises two independent magnets, acting upon independent armatures mounted upon a common swinging carrier, the energizing coils of said magnets being in circuits so proportioned as to resistance, inductance and capacity, that the current through the coils of one magnet is displaced in phase about 90° with respect to the current through the coils of the other magnet. The attractive force of each magnet is, therefore, at its maximum when the attractive force of the other magnet is at its minimum, with the result that the mean attractive force exerted upon the carrier for the armatures of said magnets is nearly uniform. Thereby I avoid the constant breaking of contact between the armature support and front contact point heretofore experienced when ordinary neutral relays have been used in alternating current circuits.

The objects of my invention are to improve the construction of alternating current relays, to provide a relay which responds upon opening or closing of the alternating energizing circuit substantially as readily as does a neutral relay to the opening and closing of a direct current circuit, and with the production of as good contacts; and generally to make the relay simple, compact and easy to construct and adjust.

I will now proceed to describe my invention with reference to the accompanying drawings, and will then point out the novel features in claims.

Figure 1:
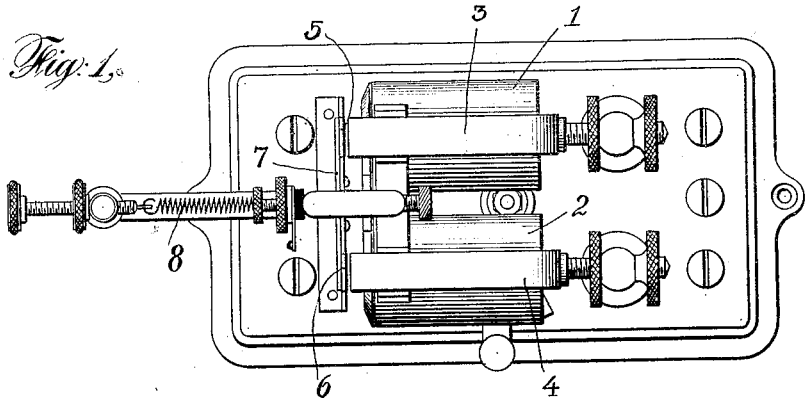
Figure 2:
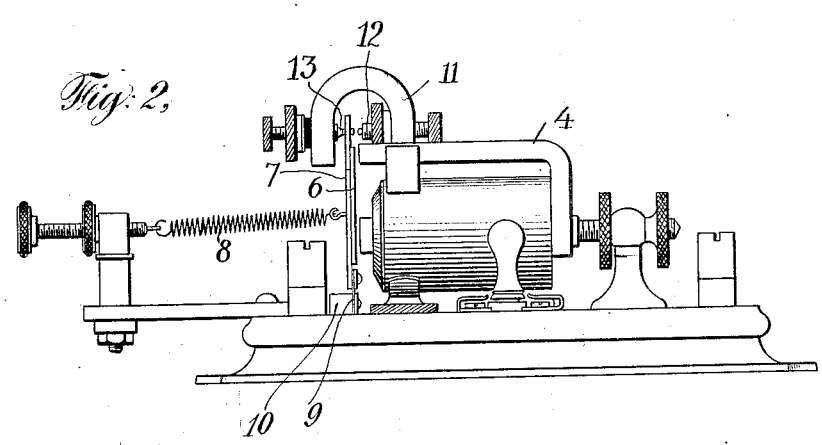
Figure 3:
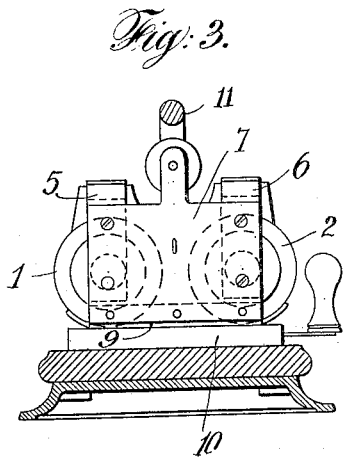

In the drawings: Figure 1 shows a top view of my improved relay, Fig. 2 a side elevation thereof and Fig. 3 a transverse section thereof. Fig. 4 is a diagram illustrating the parallel arrangement of the circuits of the two magnets and their independence as to inductance, resistance and capacity. Figs. 5, 6, 7 and 8 are vector diagrams illustrating different proportions of inductance, resistance and capacity which may be employed in the circuits of the two magnets.

In appearance my improved relay resembles closely an ordinary direct current or neutral relay; but instead of employing an ordinary horseshoe electromagnet with one armature therefor, I provide two independent electromagnets 1 and 2 the cores 3 and 4 respectively of which are well separated one from another so that the magnetic flux of each magnet is substantially distinct from that of the other magnet; and I provide separate armatures 5 and 6 respectively for the two magnets, said armatures being mounted upon a common carrier 7. This carrier 7 is supported so as to be susceptible of moving toward and from the magnet poles, and is provided with the usual retractile spring 8. I prefer not to employ for this armature support, the usual pivotal mounting, but instead prefer to employ a flexible metallic strip 9 clamped to said armature support, and to a stationary block 10. Using this flexible mounting obviates a certain jar or vibration that is apt to be experienced when the ordinary pivotal mounting is used, which jar or vibration, if it exists, interferes with the maintenance of good contacts. The relay is provided with the usual yoke or bracket 11 carrying a front contact screw 12, and a rear stop or contact screw 13. In practice this relay will ordinarily be used with separate inductive and ohmic resistances and condensers in circuit with the coils of these two magnets. This is indicated in Fig. 4 showing the electrical connections and showing, in circuit with each of the two magnets 1 and 2 inductive resistance L' or L'' respectively, and ohmic resistance R' or R'' respectively, and a condenser C' or C'' respectively. It will be understood that the coils of the relay magnets have of necessity both ohmic and inductive resistance, and that in the circuit of these magnets such other ohmic or inductive resistance must be used as will give the desired results as explained hereinafter.

Fig. 5 is a vector diagram illustrating one proportion of inductance, resistance and capacity for the two magnets 1 and 2, which has been found suitable for displacing the phase of one magnet about 90° with respect to the other magnet. In this diagram, OB represents the total ohmic resistance of the circuit of magnet 1, BA represents the inductance value in such circuit, and OA the impedance of such circuit. In this case the static capacity of the circuit is assumed to be zero—i. e. no condenser C' is employed. OC represents the total ohmic resistance of the circuit of magnet 2, AD the impedance of condenser C'' which neutralizes the inductance of the circuit, having a surplus CD, and OD the total impedance in the circuit of magnet 2. The quantities CD and OB are of such value with reference to the quantities AB and OC that the impedance line OD of the circuit of magnet 2 is at right angles to the impedance line OA of the circuit of magnet 1. It follows, therefore, that in circuits having inductance, ohmic resistance and capacity, proportioned as represented in this figure, the phase of magnetization of magnet 2 will differ by 90° from the phase of magnetization of magnet 1. Furthermore, the resistance of OC equals inductance BA, and the resistance OB equals the excess of capacity over inductance, CD, and, therefore, the impedance OA equals the impedance OD; from which it follows that the attraction of the two magnets will be equal.

Fig. 6 represents another and preferable proportion of the various quantities of the circuits of the two magnets. As represented in this figure the resistance and inductance of the two magnet coils are equal. OC represents the total ohmic resistance in the circuit of each magnet, CA the total inductance in the circuit of magnet 1, AB the condenser impedance in the circuit of magnet 1, and OB the effective impedance in the circuit of magnet 1. CD represents, as in Fig. 5, the excess of impedance due to condenser C'' over the inductance in the circuit of magnet 2—such condenser having such capacity that it completely neutralizes the inductance of the circuit of magnet 2 leaving a surplus CD. With capacity, ohmic resistance and inductance proportioned as shown in this diagram, there is a 45° lagging current passing through magnet 1, and a 45° leading current passing through magnet 2, giving the condition of currents 90° displaced in phase and of equal intensity. The arrangement illustrated in Fig. 6 is quite workable, but is open to a possible objection due to a certain difficulty experienced in balancing the relay coils with condensers of proper value, due to the fact that values AB and AD (Fig. 6) are large in comparison with values BC and CD, which means that a small change in the condensers materially changes the resulting current relations, so that it is necessary with this arrangement to adjust the condenser with considerable nicety to secure proper operation. Fig. 7 shows an alternative arrangement which, though open to the objection that the total impedance of the relay is greater than in the instance shown in Fig. 6, is nevertheless preferable in many cases, because with this arrangement of Fig. 7 it is much easier to secure the proper relations and consequently bring the relay in balance. The ohmic resistance of each magnet is represented by OC, the inductance of the circuit of magnet 1 is represented by CA and the impedance of condenser C' by AB, the inductive value of the circuit of magnet 1 being, therefore, several times the resistance value of that circuit. OE represents the resistance of the circuit of magnet 2—a resistance very much greater than the resistance in the circuit of magnet 1 and equal in fact to the inductance CB of the circuit of magnet 1. As in the preceding Figs. 5 and 6 the condenser C'' in the circuit of magnet 2 is of such value as to neutralize completely the inductance in the circuit, and to produce a surplus ED, equal to the ohmic resistance OC in the circuit of magnet 1. The result is, as indicated in the diagram, that the current through magnet 2 leads the current through magnet 1 in phase by 90°, and is of equal intensity. The arrangement shown in Fig. 7 has the important advantage that the condensers need not be adjusted to so exact a value as in the arrangement shown in Fig. 6; after condenser C' is inserted in circuit of magnet 1, the resistance in the circuit of magnet 2 is increased to a point determined by the inductance and capacity of the circuit of magnet 1. The capacity of the condenser C'' in the circuit of magnet 2 can then vary through quite a little range without materially changing the phase value or the intensities of the currents through the two magnets.

A similar displacement in phase may be produced using different inductance in the two circuits. Fig. 8 illustrates this condition. In this figure OC represents the ohmic resistance in the circuit of magnet 1, CA the inductance in that circuit and AB the impedance of condenser C'. OE represents the ohmic resistance in the circuit of magnet 2, ED the excess of impedance of condenser C'' over the inductance in the circuit of magnet 2, and GD the impedance of condenser C''. CA represents the inductance in the circuit of magnet 1, and FG the inductance in the circuit of magnet 2. Lines OB and OD being at right angles, it follows that the currents in the two magnets are displaced in phase 90°. The impedance OD in the circuit of magnet 2 is half the impedance OB in the circuit of magnet 1, from which it follows that if, as should be the case, magnet 1 has twice the number of turns that magnet 2 has, the pull of the two magnets on their respective armatures will be the same. In this connection, it may be said that the relay illustrated and described in this case also embodies to some extent the principle of a vibratory armature having a stationary node opposite its contact point described in my prior filed applications Sr. Nos. 554,667, 574,202 and my companion application Sr. No. 583,443; the relay herein described being similar to that of my companion application Sr. No. 583,443 in that the armature is supported by a flexible strip 9 instead of by trunnion screws such as are usually employed in relays, and in that between the said support and the contact point there is a weight mass, the carrier 7 and armatures carried thereby, affecting the normal rate of vibration of the armature mass as a whole. But the mean attractive force exerted upon the carrier 7 being nearly uniform, there is, as compared with the relays of my above mentioned applications, relatively little tendency on the armature mass as a whole to vibrate. While the tendency to vibrate such armature which does exist makes it desirable that the weight mass of the armature structure as a whole, shall have approximately the relation required to give the armature structure the desired normal rate of vibration, there is, in this relay, a greater working margin in this respect than in the relays of my above mentioned applications, so that the same care in design of the armature structure with reference to its intended rate of vibration is not necessary.

It is, of course, a matter of convenience in manufacture only that causes the two magnets, in the above described circuit arrangements of Figs. 5, 6 and 7 to be made substantially equal as regards inductance and ohmic resistance; the differences in inductance, resistance and capacity by which the difference in phase of the two circuits is produced being produced by means external to said magnets. The result would be the same if the windings of the magnets were different to such degree as to produce differences in inductance and resistance corresponding to the differences produced as above described, by external means.

What I claim is:

1. An alternating current relay comprising in combination a plurality of independent magnets and a corresponding plurality of independent armatures therefor, a common carrier for said armatures arranged to permit movement thereof toward and from the poles of their respective magnets, and parallel circuit-loops for said aforesaid magnets, each including one of said magnets, adapted for connection to a main alternating circuit, such circuits possessing resistance, inductance and capacity so differing from each other that the phases of magnetization of the one magnet are displaced with reference to corresponding phases of another magnet.

2. An alternating current relay comprising in combination a plurality of separate magnets, a corresponding plurality of separate armatures therefor, a common carrier for said armatures arranged to permit same to move together toward and from their magnet poles, and parallel circuits for said magnets comprising resistance, capacity and inductance so proportioned relatively that, when said parallel circuits are connected to a common supply circuit, there is in one of said parallel circuits a lagging current and in the other of said circuits a leading current.

3. An alternating current relay comprising in combination a plurality of independent magnets, a corresponding plurality of independent armatures, a common support for said armatures adapted to permit them to move toward and from their respective magnet poles and independent parallel circuits for said magnets, adapted for connection to a main alternating circuit and having electrical qualities, such that the current phases in said parallel circuits, and the consequent phases of magnetization of the two magnets, differ respectively.

In testimony whereof I affix my signature, in the presence of two witnesses.

JOSEPH F. D. HOGE.

Witnesses:
 H. M. MARBLE,
 D. A. DAVIES.

---

Copies of this patent may be obtained for five cents each, by addressing the "Commissioner of Patents, Washington, D. C."